L. Stewart,
Saw.
N° 10,932.    Patented May. 16, 1854.
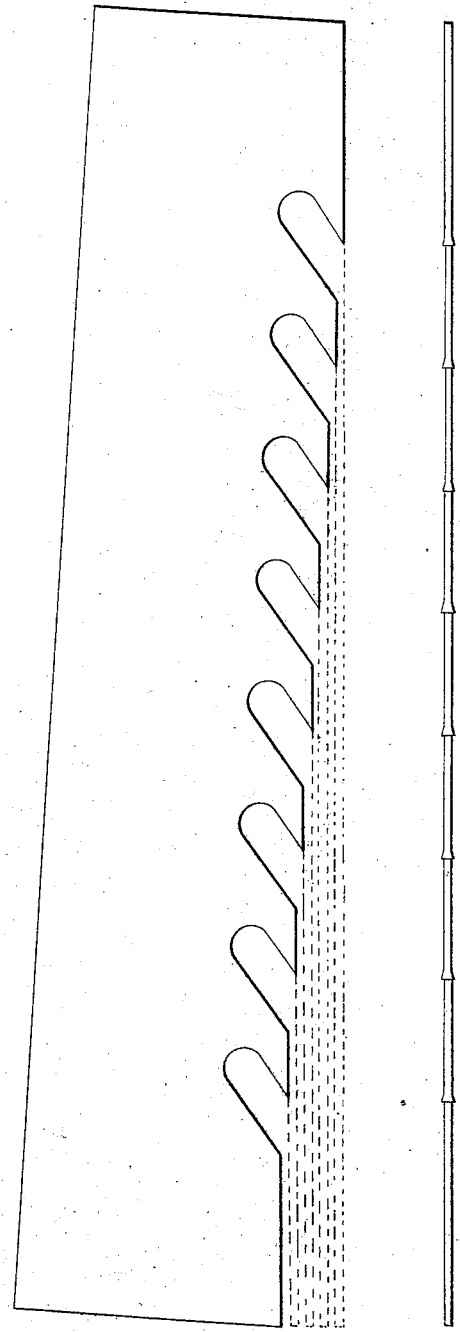
Witnesses:
John McClelland
John T. Ball
Inventor,
Linus Stewart

UNITED STATES PATENT OFFICE.

LINUS STEWART, OF WASHINGTON, DISTRICT OF COLUMBIA.

SAW.

Specification of Letters Patent No. 10,932, dated May 16, 1854.

*To all whom it may concern:*

Be it known that I, LINUS STEWART, of the city of Washington, District of Columbia, have invented a new and Improved Mode of Constructing Saw-Teeth; and I do hereby declare that the following is a full and exact description thereof, reference being had to the accompanying drawings and to the lines, notes, and references marked thereon.

The nature of my invention is so to construct and arrange the teeth of the saw that each tooth shall cut its way clean through the wood, without tearing or forcing the saw, each tooth acting as a mortise chisel and cutting a chip or core of the same thickness as each tooth stands in advance of the one next behind it. The cutting part of each tooth to be exactly vertical, and notwithstanding each tooth advances in front of the one next behind it, the blade of the same to be of equal width requiring the back of the saw to be inclined forward, as per drawing, the saws being capable of being attached to any mill—the size of the opening between the teeth to be increased or reduced according to the length of the saw and the size of the timber to be cut, so that each space between the teeth shall be capable of holding the entire chip or core that the tooth behind it may cut off.

What I claim is—

The construction and arranging of the saw teeth, substantially as described; that is, each tooth shall project beyond the next one below it, a distance equal to the depth it is intended to cut, and each tooth having its forward edge or sole, vertical, and parallel to the corresponding edges or soles, of all the other teeth; for the purposes set forth.

LINUS STEWART.

Witnesses:
JOHN MCCLELLAND,
JNO. W. HODGSON.